United States Patent
Baba et al.

(10) Patent No.: US 8,558,515 B2
(45) Date of Patent: Oct. 15, 2013

(54) PROTECTION CIRCUIT AND ELECTRONIC DEVICE

(75) Inventors: Norimitsu Baba, Nagano-ken (JP); Katsuyuki Honda, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 249 days.

(21) Appl. No.: 13/028,627

(22) Filed: Feb. 16, 2011

(65) Prior Publication Data
US 2011/0205678 A1 Aug. 25, 2011

(30) Foreign Application Priority Data
Feb. 24, 2010 (JP) ................................. 2010-038914

(51) Int. Cl.
*H02J 7/04* (2006.01)
*H02J 7/00* (2006.01)
*H02H 3/00* (2006.01)

(52) U.S. Cl.
USPC .............. 320/162; 320/134; 320/136; 361/86

(58) Field of Classification Search
USPC ............................... 320/162, 134, 136; 361/86
See application file for complete search history.

(56) References Cited

U.S. PATENT DOCUMENTS

| | | | | |
|---|---|---|---|---|
| 5,493,197 A * | 2/1996 | Eguchi et al. | ................. | 320/116 |
| 5,617,010 A | 4/1997 | Higashijima et al. | | |
| 5,666,040 A * | 9/1997 | Bourbeau | ...................... | 320/118 |
| 6,208,117 B1 * | 3/2001 | Hibi | ............................... | 320/134 |
| 6,313,612 B1 * | 11/2001 | Honda et al. | .................. | 320/139 |
| 6,316,909 B1 * | 11/2001 | Honda et al. | .................. | 320/108 |
| 7,183,748 B1 * | 2/2007 | Unno et al. | .................... | 320/136 |
| 7,772,805 B2 * | 8/2010 | Yamamoto et al. | ............ | 320/134 |
| 7,830,120 B2 * | 11/2010 | Ibrahim | ........................ | 320/134 |
| 7,898,216 B2 * | 3/2011 | Seki | ............................... | 320/134 |
| 8,264,205 B2 * | 9/2012 | Kopera | ......................... | 320/136 |
| 2006/0208850 A1 * | 9/2006 | Ikeuchi et al. | .................. | 340/5.8 |

FOREIGN PATENT DOCUMENTS

| | | |
|---|---|---|
| CN | 101488594 | 7/2009 |
| JP | 08-023639 | 1/1996 |

* cited by examiner

*Primary Examiner* — M'Baye Diao

(57) ABSTRACT

A protection circuit that is used with a power supply that produces charging power, and a storage battery for which normal operation is conditional upon a terminal voltage being less than or equal to a maximum voltage, including: a first switch disposed to a first path that electrically connects the storage battery and the power supply; a second path that electrically connects the storage battery and a load; a voltage detection circuit that detects a terminal voltage of the storage battery; an over-charge detection circuit that monitors the storage battery terminal voltage and controls the first switch to turn off when the terminal voltage is detected to exceed the maximum voltage; and a control circuit that controls the monitoring operation interval of the over-charge detection circuit according to the terminal voltage of the storage battery detected by the voltage detection circuit.

9 Claims, 20 Drawing Sheets

| BATTERY VOLTAGE (V) | STATE | OVER-CHARGE DETECTION CIRCUIT OPERATING CYCLE | OVER-DISCHARGE DETECTION CIRCUIT OPERATING CYCLE | CHARGE CONTROL SWITCH | DISCHARGE CONTROL SWITCH |
|---|---|---|---|---|---|
| 4.2 | OVER-CHARGED | 1s | OPERATION STOPPED | OFF | ON |
| 4.1 | NORMAL | CONSTANT/1s/10s | CONSTANT/1s/10s | ON | ON |
| 4.0 | NORMAL | CONSTANT/1s/10s | CONSTANT/1s/10s | ON | ON |
| 3.9 | NORMAL | CONSTANT/1s/10s | CONSTANT/1s/10s | ON | ON |
| 3.8 | NORMAL | CONSTANT/1s/10s | CONSTANT/1s/10s | ON | ON |
| 3.7 | NORMAL | CONSTANT/1s/10s | CONSTANT/1s/10s | ON | ON |
| 3.6 | NORMAL | CONSTANT/1s/10s | CONSTANT/1s/10s | ON | ON |
| 3.5 | NORMAL | CONSTANT/1s/10s | CONSTANT/1s/10s | ON | ON |
| 3.4 | NORMAL | CONSTANT/1s/10s | CONSTANT/1s/10s | ON | ON |
| 3.3 | NORMAL | CONSTANT/1s/10s | CONSTANT/1s/10s | ON | ON |
| 3.2 | NORMAL | CONSTANT/1s/10s | CONSTANT/1s/10s | ON | ON |
| 3.1 | NORMAL | CONSTANT/1s/10s | CONSTANT/1s/10s | ON | ON |
| 3.0 | NORMAL | CONSTANT/1s/10s | CONSTANT/1s/10s | ON | ON |
| 2.9 | NORMAL | CONSTANT/1s/10s | CONSTANT/1s/10s | ON | ON |
| 2.8 | NORMAL | CONSTANT/1s/10s | CONSTANT/1s/10s | ON | ON |
| 2.7 | NORMAL | CONSTANT/1s/10s | CONSTANT/1s/10s | ON | ON |
| 2.6 | OVER-DISCHARGED | OPERATION STOPPED | 10s | ON | OFF |

FIG. 3

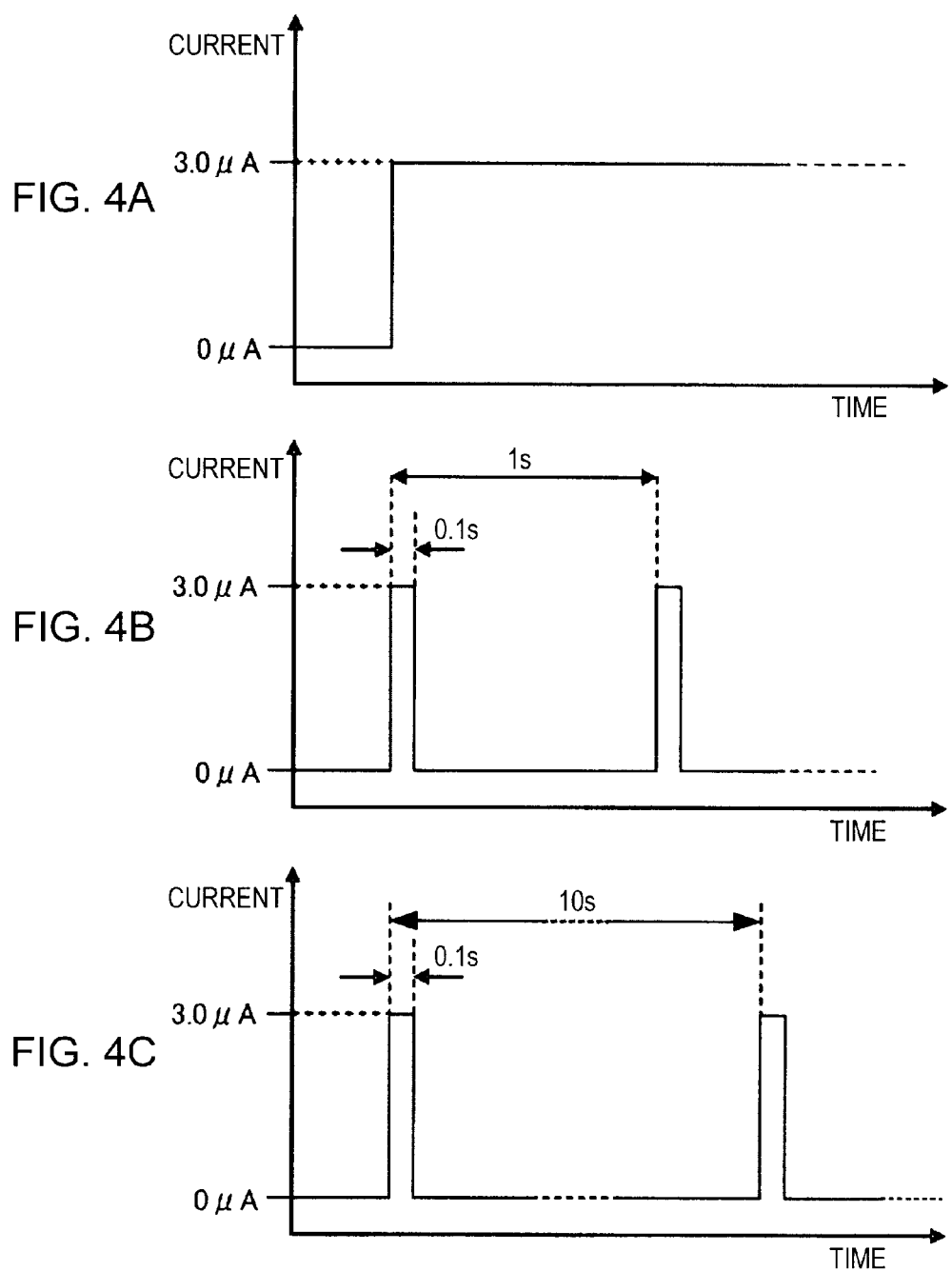

| BATTERY VOLTAGE (V) | STATE | OVER-CHARGE DETECTION CIRCUIT OPERATING CYCLE | OVER-DISCHARGE DETECTION CIRCUIT OPERATING CYCLE | CHARGE CONTROL SWITCH | DISCHARGE CONTROL SWITCH |
|---|---|---|---|---|---|
| 4.2 | OVER-CHARGED | 1s | OPERATION STOPPED | OFF | ON |
| 4.1 | NORMAL | 1s | 1s | ON | ON |
| 4.0 | NORMAL | 1s | 1s | ON | ON |
| 3.9 | NORMAL | 10s | 10s | ON | ON |
| 3.8 | NORMAL | 10s | 10s | ON | ON |
| 3.7 | NORMAL | 10s | 10s | ON | ON |
| 3.6 | NORMAL | 10s | 10s | ON | ON |
| 3.5 | NORMAL | 10s | 10s | ON | ON |
| 3.4 | NORMAL | 10s | 10s | ON | ON |
| 3.3 | NORMAL | 10s | 10s | ON | ON |
| 3.2 | NORMAL | 10s | 10s | ON | ON |
| 3.1 | NORMAL | 10s | 10s | ON | ON |
| 3.0 | NORMAL | 1s | 1s | ON | ON |
| 2.9 | NORMAL | 1s | 1s | ON | ON |
| 2.8 | NORMAL | 1s | 1s | ON | ON |
| 2.7 | NORMAL | 1s | 1s | ON | ON |
| 2.6 | OVER-DISCHARGED | OPERATION STOPPED | 10s | ON | OFF |

FIG. 9

| BATTERY VOLTAGE (V) | STATE | OVER-CHARGE DETECTION CIRCUIT OPERATING CYCLE | OVER-DISCHARGE DETECTION CIRCUIT OPERATING CYCLE | CHARGE CONTROL SWITCH | DISCHARGE CONTROL SWITCH |
|---|---|---|---|---|---|
| 4.2 | OVER-CHARGED | 1s | OPERATION STOPPED | OFF | ON |
| 4.1 | NORMAL | 1s | 10s | ON | ON |
| 4.0 | NORMAL | 1s | 10s | ON | ON |
| 3.9 | NORMAL | 1s | 10s | ON | ON |
| 3.8 | NORMAL | 1s | 10s | ON | ON |
| 3.7 | NORMAL | 10s | 10s | ON | ON |
| 3.6 | NORMAL | 10s | 10s | ON | ON |
| 3.5 | NORMAL | 10s | 10s | ON | ON |
| 3.4 | NORMAL | 10s | 10s | ON | ON |
| 3.3 | NORMAL | 10s | 10s | ON | ON |
| 3.2 | NORMAL | 10s | 10s | ON | ON |
| 3.1 | NORMAL | 10s | 10s | ON | ON |
| 3.0 | NORMAL | 10s | 10s | ON | ON |
| 2.9 | NORMAL | 10s | 1s | ON | ON |
| 2.8 | NORMAL | 10s | 1s | ON | ON |
| 2.7 | NORMAL | 10s | 1s | ON | ON |
| 2.6 | OVER-DISCHARGED | OPERATION STOPPED | 10s | ON | OFF |

FIG.10

| BATTERY VOLTAGE (V) | STATE | OVER-CHARGE DETECTION CIRCUIT OPERATING CYCLE | OVER-DISCHARGE DETECTION CIRCUIT OPERATING CYCLE | CHARGE CONTROL SWITCH | DISCHARGE CONTROL SWITCH |
|---|---|---|---|---|---|
| 4.2 | OVER-CHARGED | 1s | OPERATION STOPPED | OFF | ON |
| 4.1 | NORMAL | CONSTANT | 10s | ON | ON |
| 4.0 | NORMAL | CONSTANT | 10s | ON | ON |
| 3.9 | NORMAL | CONSTANT | 10s | ON | ON |
| 3.8 | NORMAL | CONSTANT | 10s | ON | ON |
| 3.7 | NORMAL | 10s | 10s | ON | ON |
| 3.6 | NORMAL | 10s | 10s | ON | ON |
| 3.5 | NORMAL | 10s | 10s | ON | ON |
| 3.4 | NORMAL | 10s | 10s | ON | ON |
| 3.3 | NORMAL | 10s | 10s | ON | ON |
| 3.2 | NORMAL | 10s | 10s | ON | ON |
| 3.1 | NORMAL | 10s | CONSTANT | ON | ON |
| 3.0 | NORMAL | 10s | CONSTANT | ON | ON |
| 2.9 | NORMAL | 10s | CONSTANT | ON | ON |
| 2.8 | NORMAL | 10s | CONSTANT | ON | ON |
| 2.7 | NORMAL | 10s | CONSTANT | ON | ON |
| 2.6 | OVER-DISCHARGED | OPERATION STOPPED | 10s | ON | OFF |

FIG.12

| BATTERY VOLTAGE (V) | STATE | OVER-CHARGE DETECTION CIRCUIT OPERATING CYCLE | OVER-DISCHARGE DETECTION CIRCUIT OPERATING CYCLE | CHARGE CONTROL SWITCH | DISCHARGE CONTROL SWITCH |
|---|---|---|---|---|---|
| 4.2 | OVER-CHARGED | 1s | OPERATION STOPPED | OFF | ON |
| 4.1 | NORMAL | 1s | OPERATION STOPPED | ON | OFF |
| 4.0 | NORMAL | 1s | OPERATION STOPPED | ON | OFF |
| 3.9 | NORMAL | 10s | OPERATION STOPPED | ON | OFF |
| 3.8 | NORMAL | 10s | OPERATION STOPPED | ON | OFF |
| 3.7 | NORMAL | 10s | OPERATION STOPPED | ON | OFF |
| 3.6 | NORMAL | OPERATION STOPPED | 10s | OFF | ON |
| 3.5 | NORMAL | OPERATION STOPPED | 10s | OFF | ON |
| 3.4 | NORMAL | OPERATION STOPPED | 10s | OFF | ON |
| 3.3 | NORMAL | OPERATION STOPPED | 10s | OFF | ON |
| 3.2 | NORMAL | OPERATION STOPPED | 1s | OFF | ON |
| 3.1 | NORMAL | OPERATION STOPPED | 1s | OFF | ON |
| 3.0 | NORMAL | OPERATION STOPPED | 1s | OFF | ON |
| 2.9 | NORMAL | OPERATION STOPPED | 1s | OFF | ON |
| 2.8 | NORMAL | OPERATION STOPPED | 1s | OFF | ON |
| 2.7 | NORMAL | OPERATION STOPPED | 1s | OFF | ON |
| 2.6 | OVER-DISCHARGED | OPERATION STOPPED | 10s | ON | OFF |

FIG.14

| BATTERY VOLTAGE (V) | STATE | OVER-CHARGE DETECTION CIRCUIT OPERATING CYCLE | OVER-DISCHARGE DETECTION CIRCUIT OPERATING CYCLE | CHARGE CONTROL SWITCH | DISCHARGE CONTROL SWITCH |
|---|---|---|---|---|---|
| 4.2 | OVER-CHARGED | 1s | OPERATION STOPPED | OFF | ON |
| 4.1 | NORMAL | 1s | OPERATION STOPPED | ON | OFF |
| 4.0 | | | | | |
| 3.9 | | | | | |
| 3.8 | | | | | |
| 3.7 | | OPERATION STOPPED | | OFF | |
| 3.6 | | | | | |
| 3.5 | | | | | |
| 3.4 | | | | | |
| 3.3 | | | | | |
| 3.2 | | | | | |
| 3.1 | | | | | |
| 3.0 | | | | | |
| 2.9 | | | 1s | | ON |
| 2.8 | | | 10s | ON | |
| 2.7 | | | | | |
| 2.6 | OVER-DISCHARGED | OPERATION STOPPED | | | OFF |

FIG.15

PROTECTION CIRCUIT AND ELECTRONIC DEVICE

BACKGROUND

1. Technical Field

The present invention relates to a protection circuit that detects over-charge and over-discharge of a storage battery and protects the storage battery, and relates more particularly to technology that reduces the power consumption required to detect over-charge and over-discharge states.

2. Related Art

Lithium ion batteries are one type of rechargeable storage battery. Lithium ion batteries offer high voltage, high energy density, and no memory effect or loss of capacity due to repeated shallow discharge/charge cycles, and are therefore widely used in portable electronic devices such as cell phones, notebook computers, and portable computing devices such as personal digital assistants (PDA).

Storage batteries generally require a protection circuit that monitors charging and discharging in order to maintain quality and safety. In addition to the normal operating voltage range being extremely close to the voltage range of the over-charge and over-discharge danger zones, however, the safety and quality of lithium ion batteries in particular are greatly affected by over-charging and over-discharging. As a result, protection circuits used with lithium ion batteries must consistently provide very precise detection of over-charge and over-discharge states, typically on the level of several 10 mV. Lithium ion batteries are protected by turning charging off when an over-charge state is detected, and turning discharging off when an over-discharge state is detected.

Reducing power consumption in order to extend drive time (operating time) is desirable in portable devices that use lithium ion batteries and other types of storage batteries. Reducing power consumption in the protection circuit that monitors charging and discharging is therefore also desirable. In order to reduce power consumption in an over-charge detection circuit and over-discharge detection circuit that detect over-charge and over-discharge states by comparing the storage battery voltage with a reference voltage with high precision, Japanese Unexamined Patent Appl. Pub. JP-A-H08-23639 teaches driving the over-charge detection circuit and over-discharge detection circuit in cycles with a specific gap therebetween instead of constantly.

Storage batteries are also now commonly used in small devices such as wristwatches. In addition to reducing the size of the storage battery, this means that battery capacity is also reduced. Even greater efficiency is therefore required in the protection circuit in order to further extend the drive time and improve product utility in devices that use a storage battery with relatively small battery capacity.

Power consumption could be reduced by further increasing the interval between the operating periods of the over-charge detection circuit and over-discharge detection circuit as taught in JP-A-H08-23639, but this means that detecting the danger zone may be delayed, impairing the ability to maintain quality and assure safety.

SUMMARY

A protection circuit according to the invention can reduce power consumption while maintaining the detection precision of the threshold voltage of normal operation.

A first aspect of the invention is a protection circuit that is used with a power supply that produces charging power, and a storage battery for which normal operation is conditional upon a terminal voltage being less than or equal to a maximum voltage, including: a first switch disposed to a first path that electrically connects the storage battery and the power supply; a second path that electrically connects the storage battery and a load; a voltage detection circuit that detects a terminal voltage of the storage battery; an over-charge detection circuit that monitors the storage battery terminal voltage and controls the first switch to turn off when the terminal voltage is detected to exceed the maximum voltage; and a control circuit that controls the monitoring operation interval of the over-charge detection circuit according to the terminal voltage of the storage battery detected by the voltage detection circuit.

This aspect of the invention can control the monitoring operation according to the state of the storage battery by controlling the monitoring operation interval of the over-charge detection circuit according to the terminal voltage of the storage battery. As a result, power consumption can be reduced while maintaining the detection precision of the threshold voltage of normal operation.

Another aspect of the invention is a protection circuit that is used with a power supply that produces charging power, and a storage battery for which normal operation is conditional upon a terminal voltage being greater than or equal to a minimum voltage and less than or equal to a maximum voltage, including: a first switch disposed to a first path that electrically connects the storage battery and the power supply; a second switch disposed to a second path that electrically connects the storage battery and a load; a voltage detection circuit that detects a terminal voltage of the storage battery; an over-charge detection circuit that monitors the storage battery terminal voltage and controls the first switch to turn off when the terminal voltage is detected to exceed the maximum voltage; an over-discharge detection circuit that monitors the storage battery terminal voltage and controls the second switch to turn off when the terminal voltage is detected to be below the minimum voltage; and a control circuit that controls the monitoring operation interval of the over-charge detection circuit and the over-discharge detection circuit according to the terminal voltage of the storage battery detected by the voltage detection circuit.

This aspect of the invention can control the monitoring operation according to the state of the storage battery by controlling the monitoring operation interval of the over-charge detection circuit and the over-discharge detection circuit according to the terminal voltage of the storage battery. As a result, power consumption can be reduced while maintaining the detection precision of the threshold voltage of normal operation.

Preferably, the voltage detection circuit detects the terminal voltage of the storage battery at a longer interval than the monitoring operation interval controlled by the control circuit. This can reduce power consumption by the voltage detection circuit.

Further preferably, when the first voltage is greater than the minimum voltage and less than the maximum voltage, and the second voltage is greater than the first voltage and less than the maximum voltage, the control circuit controls the monitoring operation interval of the over-charge detection circuit and the over-discharge detection circuit to become longer when the detected storage battery terminal voltage is between the first voltage and the second voltage than when the detected storage battery terminal voltage is greater than or equal to the minimum voltage and less than the first voltage, or the detected storage battery terminal voltage is greater than the second voltage and less than or equal to the maximum voltage.

More specifically, by shortening the monitoring operation interval of the over-charge detection circuit and over-discharge detection circuit when the detected voltage is near the over-discharge state or over-charge state, the detection precision of the threshold voltage of normal operation can be maintained, and by increasing the monitoring operation interval of the over-charge detection circuit and over-discharge detection circuit when the over-discharge state and over-charge state are far, power consumption can be reduced.

In another aspect of the invention, when the first voltage is greater than the minimum voltage and less than the maximum voltage, and the second voltage is greater than the first voltage and less than the maximum voltage, the control circuit controls the monitoring operation interval of the over-discharge detection circuit to become longer when the detected storage battery terminal voltage is greater than or equal to the first voltage than when the detected storage battery terminal voltage is less than the first voltage, and when the detected storage battery terminal voltage is less than the second voltage, controls the monitoring operation interval of the over-charge detection circuit to become longer than when the detected storage battery terminal voltage is greater than or equal to the second voltage.

More specifically, power consumption can be further reduced by increasing the monitoring operation of the over-charge detection circuit when the over-charge state is far, and by increasing the monitoring operation of the over-discharge detection circuit.

In a protection circuit according to another aspect of the invention, the control circuit applies control stopping the monitoring operation of the over-discharge detection circuit when the over-charge detection circuit detects that the storage battery terminal voltage exceeds the maximum voltage, and applies control stopping the monitoring operation of the over-charge detection circuit when the over-discharge detection circuit detects that the storage battery terminal voltage is less than the minimum voltage.

In a protection circuit according to another aspect of the invention, when a third voltage is greater than the minimum voltage and less than the maximum voltage, and a fourth voltage is greater than the third voltage and less than the maximum voltage, the control circuit applies control stopping the monitoring operation of the over-charge detection circuit when the detected storage battery terminal voltage is less than the fourth voltage, and controls stopping the monitoring operation of the over-discharge detection circuit when the detected storage battery terminal voltage is greater than the third voltage.

More specifically, power consumption can be further reduced by stopping the monitoring operation of the over-charge detection circuit when the over-charge state is far, and by stopping the monitoring operation of the over-discharge detection circuit when the over-discharge state is far.

Further preferably, the control circuit monotonically decreases the monitoring operation interval of the over-charge detection circuit as the detected storage battery terminal voltage increases when the detected storage battery terminal voltage is greater than or equal to the fourth voltage, and when the detected voltage is less than or equal to the third voltage, monotonically decreases the monitoring operation interval of the over-discharge detection circuit as the detected storage battery terminal voltage decreases.

Another aspect of the invention is a electronic device including: a power supply that produces charging power; a storage battery for which normal operation is conditional upon a terminal voltage being greater than or equal to a minimum voltage and less than or equal to a maximum voltage; a load; and the protection circuit described in above.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 describes the relationship between storage battery voltage and operating time.

FIG. 4 describes the relationship between operating time and consumption current.

FIG. 9 is a table showing an example of control in the first embodiment of the invention.

FIG. 10 is a table showing another example of control in the first embodiment of the invention.

FIG. 12 is a table showing an example of control in the second embodiment of the invention.

FIG. 14 is a table showing an example of control in the third embodiment of the invention.

FIG. 15 is a table showing another example of control in the third embodiment of the invention.

DESCRIPTION OF EMBODIMENTS

1. Embodiments

Figure 1:
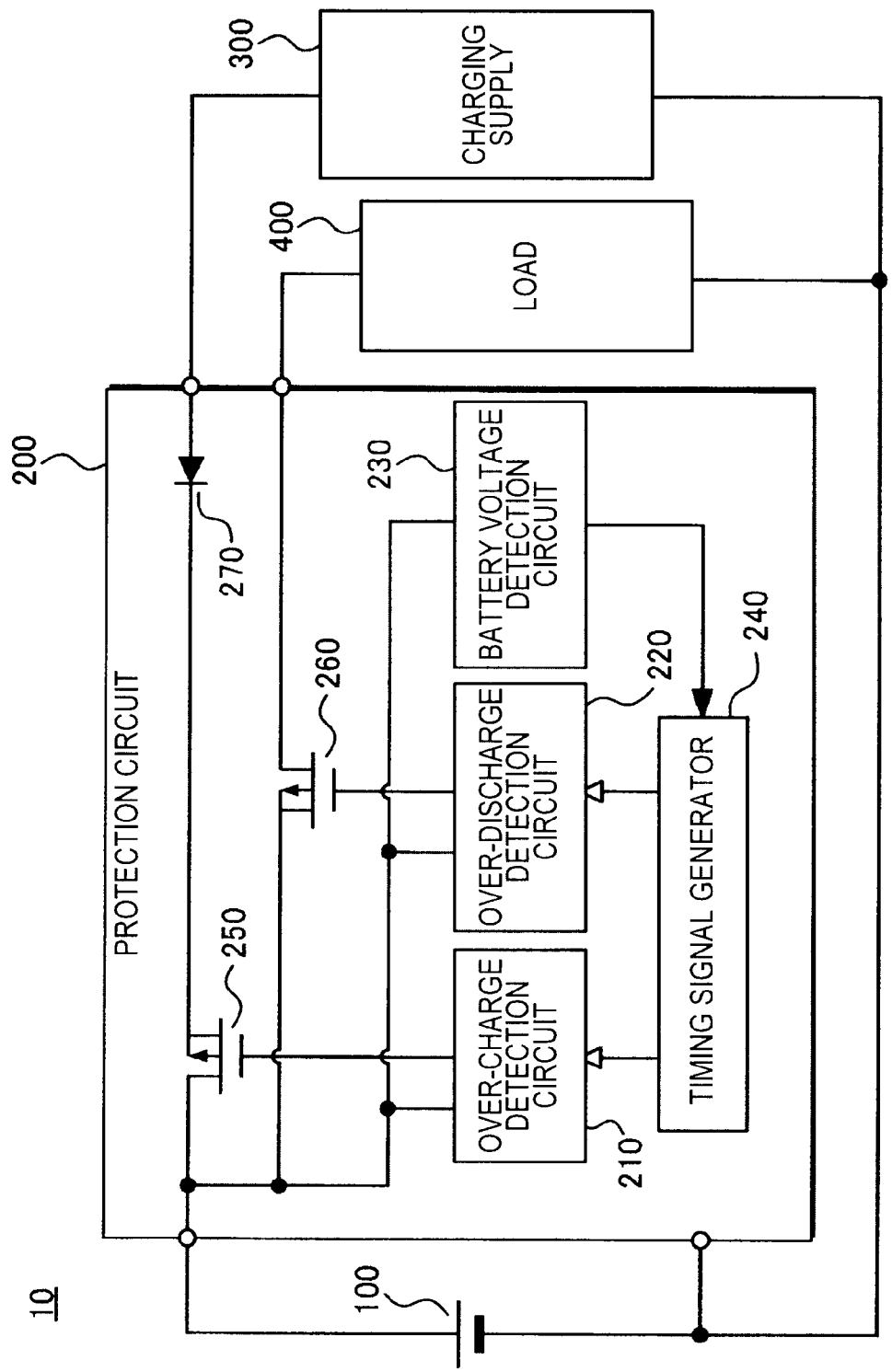
FIG. 1 is a block diagram showing the configuration of an electronic device having a protection circuit according to the invention.

Preferred embodiments of the invention are described below with reference to the accompanying figures. FIG. 1 is a block diagram showing the configuration of an electronic device with a protection circuit according to the invention. As shown in the figure, the electronic device 10 includes a rechargeable storage battery 100, a protection circuit 200, a charging supply 300, and a load 400. The storage battery 100 is electrically connected to the charging supply 300 and load 400 through the protection circuit 200. The electronic device 10 is a device that operates using the storage battery 100 as the drive power source, and may be a wristwatch, a cell phone, or a portable information device, for example.

The storage battery 100 in this embodiment of the invention is a lithium ion battery. The storage battery 100 could obviously be a different type of storage battery than a lithium ion battery, and the invention can also be used effectively with lithium ion polymer batteries, for example.

Figure 2:
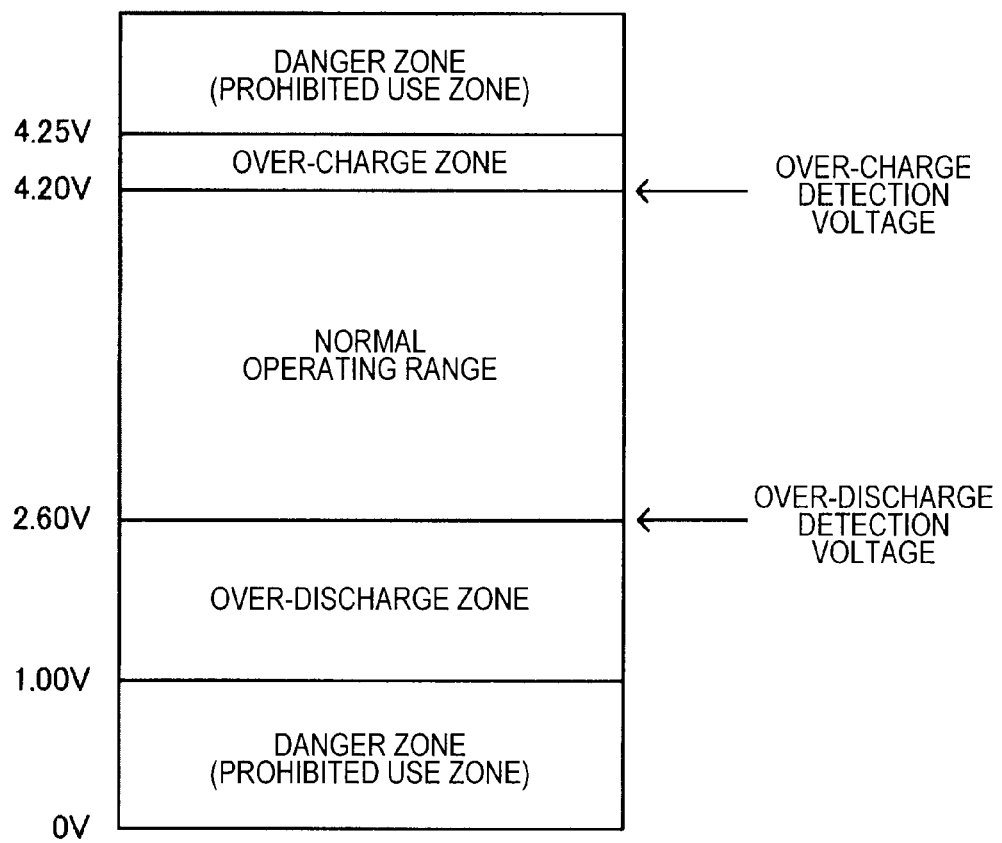
FIG. 2 describes the relationship between lithium ion battery voltage and state.

FIG. 2 shows an example of the relationship between the terminal voltage and battery state of a lithium ion battery used as the storage battery 100. As shown in the figure, 2.60 V-4.20 V is the normal operating range, that is, the voltage range of normal operation, of the lithium ion battery. The over-charge zone is 4.20 V-4.25 V, and battery performance (characteristics) deteriorates in this voltage range due to over-charging.

The danger zone is above 4.25 V, and use is prohibited in this range due to potential battery failure.

The over-discharge zone is 1.00-2.60 V, and performance deteriorates in this voltage range due to over-discharging.

Another danger zone is below 1.00 V, and use is prohibited in this range due to potential battery failure.

In this embodiment of the invention, therefore, 4.20 V, which is the upper limit of the normal operating range, is referred to as the over-charge detection voltage, and 2.60 V, which is the lower limit of the normal operating range, is referred to as the over-discharge detection voltage, and these voltages are detected as the threshold voltages of normal operation. These values are obviously used as examples only, and can be set appropriately according to the characteristics of the storage battery 100 and the application of the electronic device 10, for example.

Referring again to FIG. 1, the protection circuit 200 detects over-charge and over-discharge of the storage battery 100 based on the storage battery 100 voltage, and operates to protect the storage battery 100. More specifically, when an over-charge state is detected, the protection circuit 200 interrupts the electrical connection to the charging supply 300, and when an over-discharge state is detected, the protection circuit 200 interrupts the electrical connection to the load 400.

The charging supply 300 is a power supply used to charge the storage battery 100, and could be a solar cell, for example. The charging supply 300 is not limited to being disposed internally to the electronic device 10, and may be disposed externally to the electronic device 10 using a charger and a constant voltage power supply, for example.

The load 400 is a function unit to which power is supplied from the storage battery 100, and may be the wristwatch movement when the electronic device 10 is applied to a wristwatch, and may be cell phone components when the electronic device 10 is applied to a cell phone, for example.

In this embodiment of the invention the protection circuit 200 includes a over-charge detection circuit 210, over-discharge detection circuit 220, battery voltage detection circuit 230, timing signal generator 240, charge control switch 250, discharge control switch 260, and diode 270.

The charge control switch 250 is a switch device disposed in the path through which the storage battery 100 and charging supply 300 are electrically connected. The discharge control switch 260 is a switch device disposed in the path through which the storage battery 100 and load 400 are electrically connected. In this embodiment of the invention transistors are used for both switch devices.

The over-charge detection circuit 210 monitors the terminal voltage of the storage battery 100, and if the terminal voltage exceeds the over-charge detection voltage, turns the charge control switch 250 off to stop charging. Exceeding the over-charge detection voltage can be detected by, for example, comparing a voltage-divided voltage of the storage battery 100 with a reference voltage corresponding to the over-charge detection voltage. To prevent detection errors caused by noise, for example, the decision may be based on plural detection results.

The over-discharge detection circuit 220 monitors the terminal voltage of the storage battery 100, and if the terminal voltage goes below the over-discharge detection voltage, turns the discharge control switch 260 off to stop discharging. Going below the over-discharge detection voltage can be detected by, for example, comparing a voltage-divided voltage of the storage battery 100 with a reference voltage corresponding to the over-discharge detection voltage. To prevent detection errors caused by noise, for example, the decision may be based on plural detection results.

The battery voltage detection circuit 230 detects the terminal voltage of the storage battery 100. The battery voltage detection circuit 230 does not need to detect the storage battery 100 voltage continuously, and can detect the storage battery 100 voltage at a specific interval such as every 60 seconds. The battery voltage detection circuit 230 can be rendered using a voltage comparator or A/D convertor, for example.

The diode 270 is used to prevent current flowing from the storage battery 100 to the charging supply 300 and damage to the charging supply 300 when the charging supply 300 voltage goes below the storage battery 100 voltage.

The timing signal generator 240 controls the timing of the monitoring operation of the over-charge detection circuit 210 and the timing of the monitoring operation of the over-discharge detection circuit 220 according to the voltage detection results of the battery voltage detection circuit 230. More specifically, this embodiment of the invention changes the timing of the monitoring operation of the over-charge detection circuit 210 and over-discharge detection circuit 220 according to the storage battery 100 voltage. The timing of the monitoring operations of the over-charge detection circuit 210 and over-discharge detection circuit 220 may be synchronized or asynchronous. The timing of the monitoring operation of the over-charge detection circuit 210 or the monitor operation timing of the over-discharge detection circuit 220 may also be varied according to the characteristics of the storage battery 100, for example.

More specifically, the timing signal generator 240 maintains the detection precision of the normal operation threshold voltage by changing the timing of the monitoring operation so that the monitoring interval of the storage battery 100 voltage becomes shorter when a danger of the storage battery 100 entering an over-charge state or over-discharge state is present, and reduces power consumption by changing the timing of the monitoring operation so that the storage battery 100 voltage monitoring interval becomes longer when there is no imminent danger of entering an over-charge state or over-discharge state.

For simplicity, the timing of the monitoring operation of the over-charge detection circuit 210 and over-discharge detection circuit 220 that is controlled by the timing signal generator 240 is set to one of three levels, constant, a 1-second cycle, or a 10-second cycle. More specifically, as shown in FIG. 3, the timing of the monitoring operation of the over-charge detection circuit 210 and over-discharge detection circuit 220 is set to constant, a 1-s cycle, or a 10-s cycle at 0.1 V increments in the normal operating range from 2.7 V to 4.1 V. In the example shown in the figure, the charge control switch 250 and discharge control switch 260 are both on in the normal operating range. Note that "constant" as shown in the table means that the monitoring operation occurs constantly.

When the over-charge detection voltage of 4.2 V is detected, the timing of the monitoring operation of the over-charge detection circuit 210 is set to a 1-s cycle, and operation of the over-discharge detection circuit 220 is stopped. Because the over-charge detection circuit 210 detects the over-charge detection voltage, the charge control switch 250 is turned OFF to protect the storage battery 100.

When the over-discharge detection voltage of 2.6 V is detected, operation of the over-charge detection circuit 210 is stopped because the possibility of the terminal voltage going to the over-charge detection voltage of 4.2 V is extremely low, and the timing of the monitoring operation of the over-discharge detection circuit 220 is set to a 10-s cycle. At this time the over-discharge detection circuit 220 detects the over-discharge detection voltage and turns the discharge control switch 260 off to protect the storage battery 100.

Current consumption by the detection circuits (over-charge detection circuit 210 and over-discharge detection circuit 220) when the timing of the monitoring operation is set to constant, a 1-s cycle, and a 10-s cycle is described next. Note that one detection operation requires 0.1 s, during which time 3.0 μA of current flows to the detection circuit.

FIG. 4A shows the current flow to the detection circuit when the timing of the monitoring operation is set to constant, that is, the storage battery 100 voltage is monitored constantly with an operating interval of 0 between detection operations. In this example, current consumption is 3.0 μA/s when the detection circuit is set to constant operation.

FIG. 4B shows current flow to the detection circuit when the storage battery 100 voltage is detected at a 1-s cycle. The detection time is 0.1 s, and during the next 0.9 s detection is paused and current is not consumed. In the example shown in the figure, current consumption is 0.3 μA/s (3.0 μA×0.1 s/1 s) when the detection circuit operates on a 1-s cycle.

FIG. 4C shows current flow to the detection circuit when the storage battery 100 voltage is detected at a 10-s cycle. The detection time is 0.1 s, and during the next 9.9 s detection is paused and current is not consumed. In the example shown in the figure, current consumption is 0.03 μA/s (3.0 μA×0.1 s/10 s) when the detection circuit operates on a 10-s cycle.

If the capacity of the storage battery 100 is 10 mAH, current consumption by the load 400 is 0.5 μA, and both the over-charge detection circuit 210 and over-discharge detection circuit 220 are used, the drive time when set to the constant monitoring mode will be 10 mAH [battery capacity]/(0.5 μA [operating load]+3 μA [over-charge detection]+3 μA [over-discharge detection])/24 hr=64 days=approximately 2 months.

Similarly, the drive time when set to the 1-s cycle mode is 10 mAH [battery capacity]/(0.5 μA [operating load]+0.3 μA [over-charge detection]+0.3 μA [over-discharge detection])/24 hr=379 days=approximately 1 year.

When set to the 10-s cycle mode, the drive time is 10 mAH [battery capacity]/(0.5 μA [operating load]+0.03 μA [over-charge detection]+0.03 μA [over-discharge detection])/24 hr=744=approximately 2 years.

Power consumption can therefore be reduced and the drive time extended by setting the timing of the monitoring operation of the detection circuits to the 10-s cycle mode as much as possible.

Figure 5:
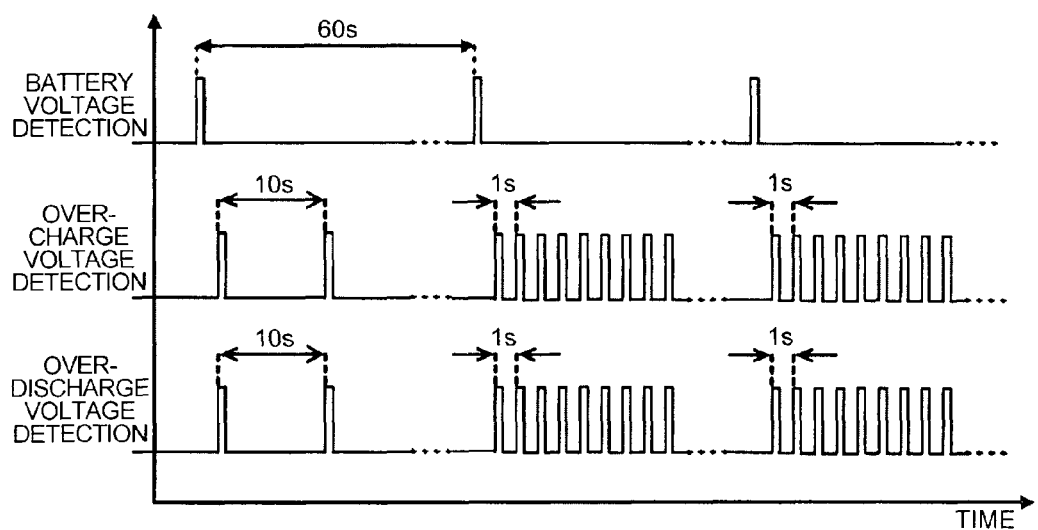
FIG. 5 is a timing chart showing the relationship between the voltage detection operating interval of the battery voltage detection circuit and the detection operation interval of the over-charge detection circuit and over-discharge detection circuit.

In addition, as shown in FIG. 5, the storage battery 100 voltage detection operating interval of the battery voltage detection circuit 230 in this embodiment of the invention is controlled to be longer than the monitor operation interval of the over-charge detection circuit 210 and over-discharge detection circuit 220. More specifically, the detection operation of the battery voltage detection circuit 230 is set to a 60-s cycle whether the monitoring operation of the over-charge detection circuit 210 and over-discharge detection circuit 220 is set to the 1-s cycle, 10-s cycle, or constant monitoring mode.

Because the detection results of the battery voltage detection circuit 230 are used to evaluate the danger of the storage battery 100 entering an over-charge state or over-discharge state, the voltage detection precision of the battery voltage detection circuit 230 does not need to be as high as the detection precision of the over-charge detection circuit 210 and over-discharge detection circuit 220, which must reliably detect the over-discharge detection voltage and over-charge detection voltage. As a result, power consumption by the battery voltage detection circuit 230 for detecting the storage battery 100 voltage can be reduced.

Figure 6:
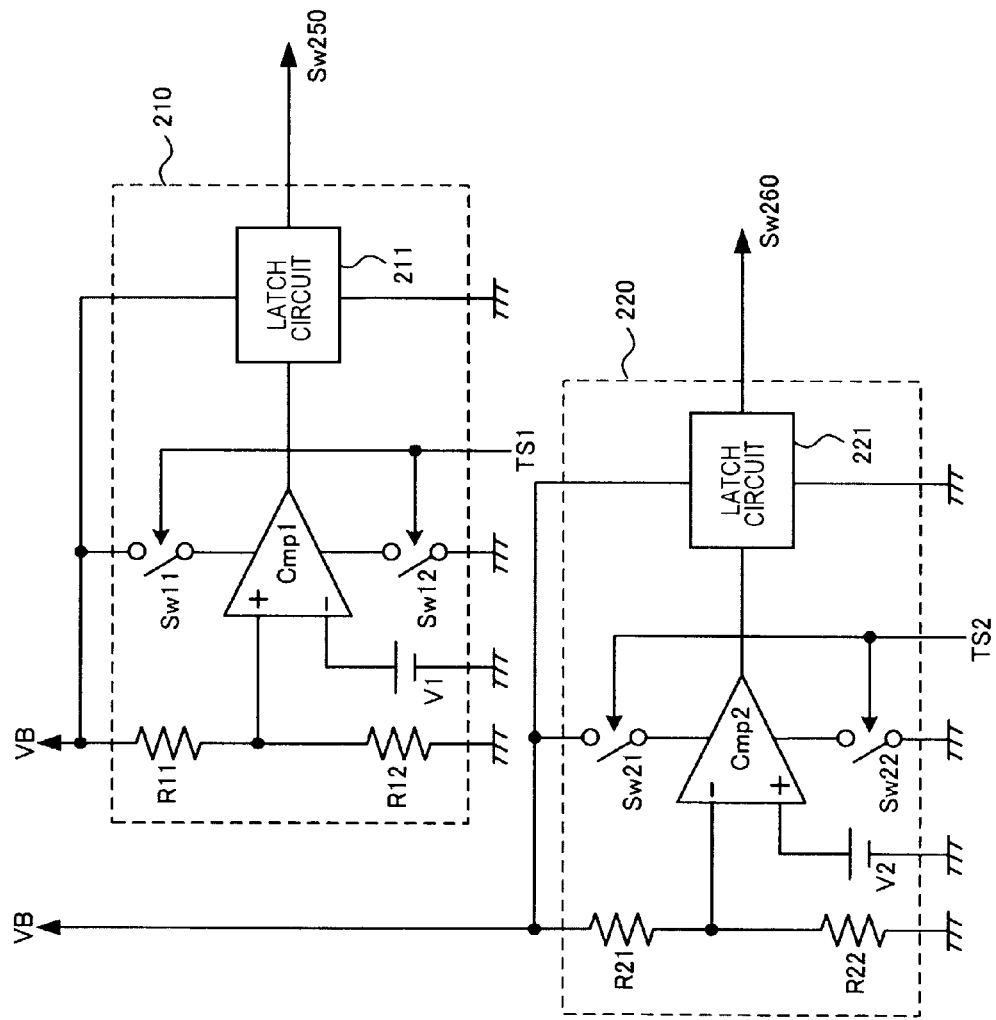
FIG. 6 shows an example of the circuit design of the over-charge detection circuit and over-discharge detection circuit.

The over-charge detection circuit 210 and over-discharge detection circuit 220 can be rendered using circuits such as shown in FIG. 6, for example. The exemplary detection circuits shown in the figure voltage divide the storage battery 100 voltage VB by means of resistor R11 (R21) and resistor R12 (R22), and compare the result with a reference voltage V1 (V2) corresponding to the respective detection voltages using comparators Cmp1 (Cmp2), and if the detected voltage goes above (below) the reference voltage, control the charge control switch 250 (discharge control switch 260) through a latch circuit 211 (221). Note that the symbols not shown in parentheses refer to the over-charge detection circuit 210, and symbols in parentheses refer to the over-discharge detection circuit 220.

The monitoring operation interval of the monitoring operation comparing the detected voltage with the reference voltage V1 (V2) is controlled by turning the power supply to the comparators Cmp1 (Cmp2) on or off by means of switch Sw11 (Sw21) and switch Sw12 (Sw22), which switch on/off according to the timing signals TS1 (TS2) from the timing signal generator 240.

When monitoring in the constant mode, switch Sw11 (Sw21) and switch Sw12 (Sw22) are always on. When monitoring in the 1-s cycle mode, switch Sw11 (Sw21) and switch Sw12 (Sw22) switch on/off on a 1-s cycle. When monitoring in the 10-s cycle mode, switch Sw11 (Sw21) and switch Sw12 (Sw22) switch on/off on a 10-s cycle.

Figure 7:
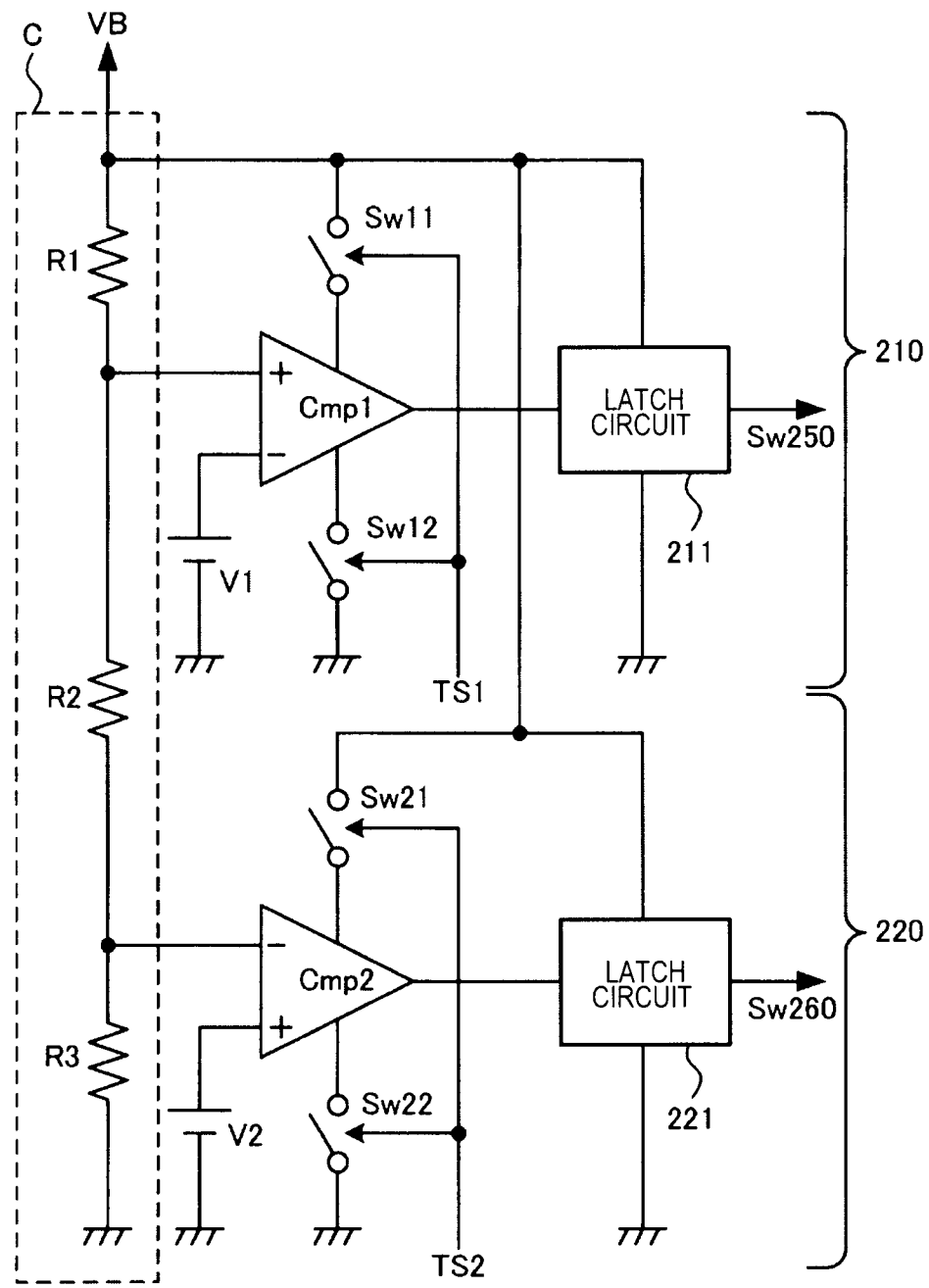
FIG. 7 shows another example of the circuit design of the over-charge detection circuit and over-discharge detection circuit.

Alternatively, the over-charge detection circuit 210 and over-discharge detection circuit 220 may be configured as shown in FIG. 7. As indicated by the dotted line C in the figure, this configuration uses resistors R1, R2, and R3 to voltage divide the storage battery 100 voltage VB, and this voltage divider is used by both over-charge detection circuit 210 and over-discharge detection circuit 220. This configuration enables further reducing the power consumption of the detection circuit.

A specific example of how the timing signal generator 240 controls the monitor operation interval of the over-charge detection circuit 210 and over-discharge detection circuit 220 is described next.

Figure 8:
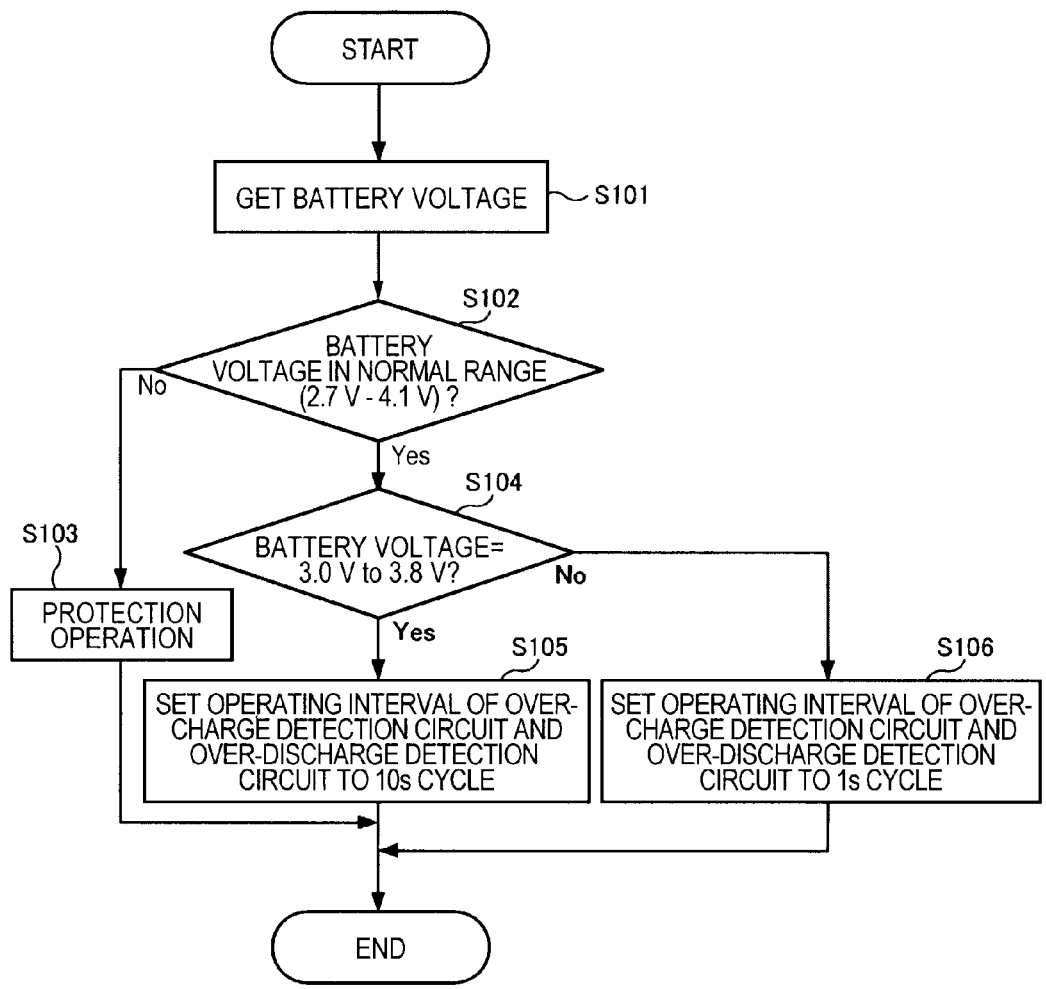
FIG. 8 is a flow chart of operating interval control of the over-charge detection circuit and over-discharge detection circuit by the timing signal generating circuit in a first embodiment of the invention.

FIG. 8 is a flow chart of the operating interval control of the over-charge detection circuit 210 and over-discharge detection circuit 220 by the timing signal generator 240 in the first embodiment of the invention. The steps shown in this flow chart are executed each time the battery voltage detection circuit 230 detects the storage battery 100 voltage.

The timing signal generator 240 first acquires the storage battery 100 voltage detected by the battery voltage detection circuit 230 (S101), and then determines if the acquired voltage is in the normal operating range of 2.7 V-4.1 V (S102). If the detected voltage is not in the range of 2.7 V-4.1 V (S102 returns No), the storage battery 100 protection operation executes (S103).

If the detected voltage is 4.2 V or more, the protection operation sets the monitoring operation interval of the over-charge detection circuit 210 to 1 s. Because the possibility of the terminal voltage soon going to the over-discharge detection voltage in this case is extremely low, the monitoring operation of the over-discharge detection circuit 220 is stopped.

If the over-charge detection circuit 210 detects the over-charge detection voltage, the charge control switch 250 turns off and charging is stopped.

If the detected voltage is less than 2.7 V, the monitoring operation interval of the over-discharge detection circuit 220 is set to 10 s. Because the possibility of the terminal voltage soon going to the over-charge detection voltage in this case is extremely low, the monitoring operation of the over-charge detection circuit 210 is stopped. If the over-discharge detection circuit 220 detects the over-discharge detection voltage, the discharge control switch 260 turns off and discharging is stopped.

If the detected voltage is in the normal operating range of 2.7 V-4.1 V (S102 returns Yes), whether the acquired voltage is in the range 3.0 V-3.8 V is determined (S104). Note that the range 3.0 V-3.8 V is a voltage range that is far from both an over-charge state and over-discharge state.

As a result, if the acquired voltage is in the range 3.0 V-3.8 V (S104 returns Yes), the monitoring operation interval of the over-charge detection circuit 210 and over-discharge detection circuit 220 is set to 10 s (S105). This is because if the acquired voltage is 3.0 V-3.8 V, there is substantially no danger of soon going to the over-charge state or over-discharge state, and increasing the over-charge detection voltage and over-discharge detection voltage monitoring interval in order to reduce power consumption will not have any effect on safety or quality assurance.

If the detected voltage is not in the range 3.0 V-3.8 V (S104 returns No), the monitoring operation interval of the over-charge detection circuit 210 and over-discharge detection circuit 220 is set to 1 s (S106). This shortens the monitoring operation interval of the over-charge detection voltage and the over-discharge detection voltage because the danger of entering the over-charge state or over-discharge state is present.

As will be understood from the flow chart in FIG. 8, operation is controlled in this first embodiment of the invention as shown in FIG. 9.

More specifically, when a first voltage is set greater than the over-discharge detection voltage and lower than the over-charge detection voltage (such as 3.0 V), a second voltage is set higher than the first voltage and lower than the over-charge detection voltage (such as 3.9 V), and the storage battery 100 voltage detected by the battery voltage detection circuit 230 is between the first voltage and the second voltage, the timing signal generator 240 sets the monitoring operation interval of the over-charge detection circuit 210 and over-discharge detection circuit 220 to be longer than when the storage battery 100 voltage is greater than or equal to the over-discharge detection voltage and less than the first voltage, or when the storage battery 100 voltage is greater than the second voltage and is less than or equal to the over-charge detection voltage.

Note that because there is little chance of the battery entering the over-discharge state when the battery voltage is near the over-charge state, and there is little chance of the battery entering the over-charge state when the battery voltage is near the over-discharge state, operation may alternatively be controlled as shown in FIG. 10 according to a variation of this embodiment.

More specifically, operation is control in this variation so that when the storage battery 100 voltage detected by the battery voltage detection circuit 230 is greater than or equal to a first voltage, the monitoring operation interval of the over-discharge detection circuit 220 is longer than when the storage battery 100 voltage is less than the first voltage; and when the storage battery 100 voltage is less than a second voltage, the monitoring operation interval of the over-charge detection circuit 210 is longer than when the storage battery 100 voltage is greater than or equal to the second voltage.

Figure 11:
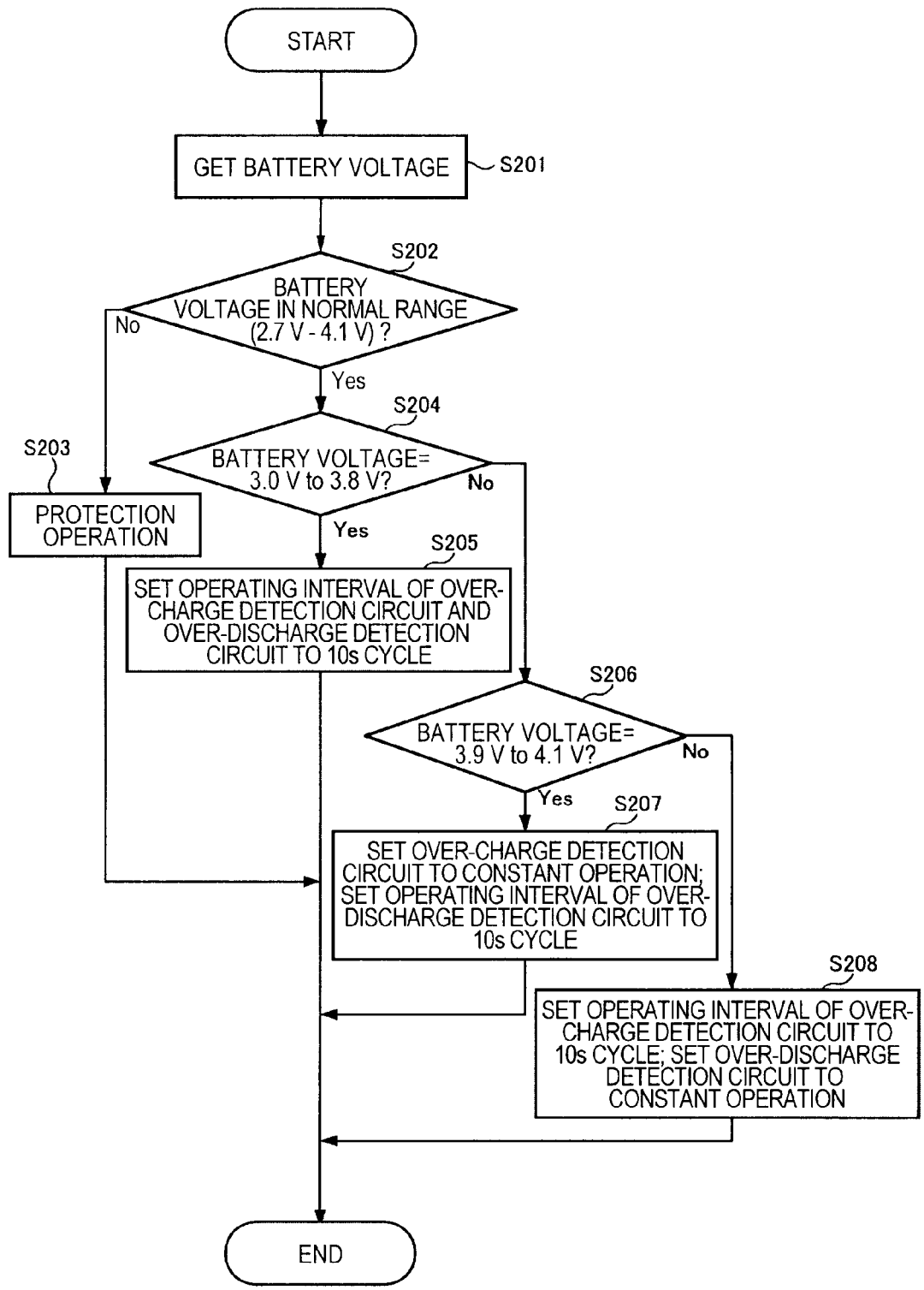
FIG. 11 is a flow chart of operating interval control of the over-charge detection circuit and over-discharge detection circuit by the timing signal generating circuit in a second embodiment of the invention.

FIG. 11 is a flow chart of the monitoring operation interval control of the over-charge detection circuit 210 and over-discharge detection circuit 220 by the timing signal generator 240 according to a second embodiment of the invention. Further description of steps common to the first embodiment is omitted below.

The timing signal generator 240 first acquires the storage battery 100 voltage detected by the battery voltage detection circuit 230 (S201), and determines if the acquired voltage is in the normal range of 2.7 V-4.1 V (S202). If not in the range 2.7 V-4.1 V (S202 returns No), the storage battery 100 protection operation executes (S203).

If the acquired voltage is in the range 2.7 V-4.1 V (S202 returns Yes), whether the acquired is in the range 3.0 V-3.8 V is determined (S204). As a result, if the acquired is in the range 3.0 V-3.8 V (S204 returns Yes), the monitoring operation interval of the over-charge detection circuit 210 and over-discharge detection circuit 220 is set to the 10-s cycle mode (S205). Operation thereafter is the same as in the first embodiment described above.

If the acquired voltage is not in the range 3.0 V-3.8 V (S204 returns No), whether the acquired voltage is in the range 3.9 V-4.1 V is determined (S206). If the voltage is in the range 3.9 V-4.1 V (S206 returns Yes), the monitoring operation of the over-charge detection circuit 210 is set to constant and the monitoring operation interval of the over-discharge detection circuit 220 is set to the 10-s cycle mode (S205).

Because the range 3.9 V-4.1 V is near the over-charge state, there is substantially no chance of soon entering an over-discharge state. The detection precision of the over-charge detection voltage can therefore be maintained by running the monitoring operation of the over-charge detection circuit 210 constantly, while power consumption can be reduced by running the monitoring operation of the over-discharge detection circuit 220 intermittently.

If the acquired voltage is not in the range 3.9 V-4.1 V (S206 returns No), that is, the storage battery 100 voltage is 2.7 V-2.9 V, the monitoring operation interval of the over-charge detection circuit 210 is set to 10 s, and the detection operation of the over-discharge detection circuit 220 is run constantly (S208).

Because the range 2.7 V-2.9 V is near the over-discharge state, there is substantially no chance of soon going to the over-charge state. Power consumption can therefore be reduced by running the detection operation of the over-charge detection circuit 210 intermittently, and the over-discharge detection voltage detection precision can be assured by running the detection operation of the over-discharge detection circuit 220 constantly.

As will be understood from the flow chart in FIG. 11, operation is controlled in this second embodiment of the invention as shown in FIG. 12.

When the storage battery 100 voltage detected by the battery voltage detection circuit 230 is greater than or equal to a first voltage, the monitoring operation interval of the over-discharge detection circuit 220 is longer than when the storage battery 100 voltage is less than the first voltage. When the storage battery 100 voltage is less than a second voltage, the monitoring operation interval of the over-charge detection circuit 210 is longer than when the storage battery 100 voltage is greater than or equal to the second voltage.

Figure 13:
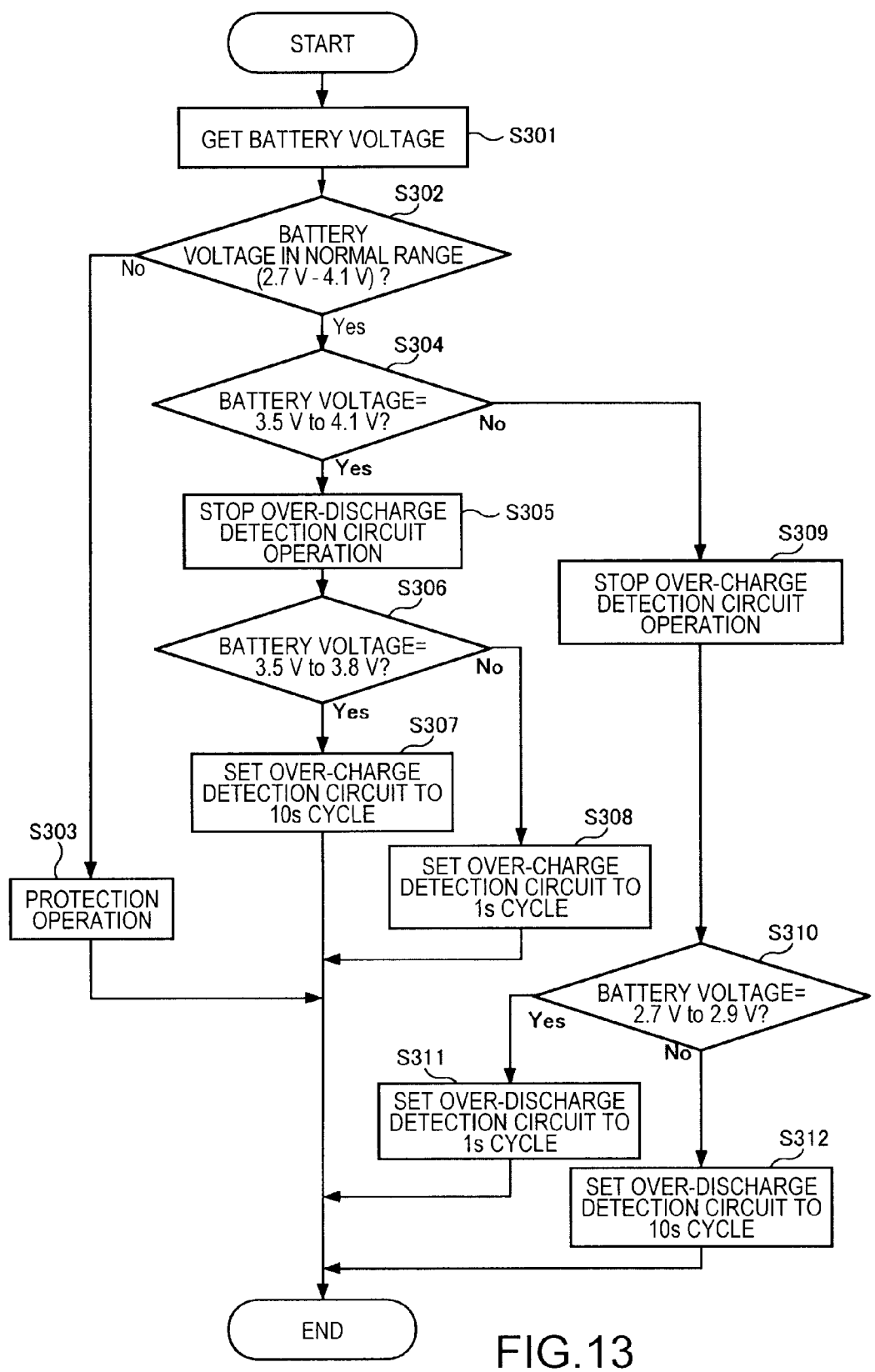
FIG. 13 is a flow chart of operating interval control of the over-charge detection circuit and over-discharge detection circuit by the timing signal generating circuit in a third embodiment of the invention.

FIG. 13 is a flow chart of the monitoring operation interval control of the over-charge detection circuit 210 and over-discharge detection circuit 220 by the timing signal generator 240 according to a third embodiment of the invention. Further description of steps common to the first and second embodiments is omitted below.

The timing signal generator 240 first acquires the storage battery 100 voltage detected by the battery voltage detection circuit 230 (S301), and determines if the acquired voltage is in the normal operating range of 2.7 V-4.1 V (S302). If the acquired voltage is outside the range 2.7 V-4.1 V (S302 returns No), the storage battery 100 protection operation is executed (S303).

If the acquired voltage is in the normal operating range of 2.7 V-4.1 V (S302 returns Yes), the timing signal generator 240 determines if the acquired voltage is in the range 3.5 V-4.1 V (S304). If it is in the range 3.5 V-4.1 V (S304 returns Yes), operation of the over-discharge detection circuit 220 is stopped because the voltage is far from the over-discharge state and there is substantially no danger of soon entering the over-discharge state (S305). As a result, power consumption by the over-discharge detection circuit 220 can be further reduced.

Whether the acquired voltage is in the range 3.5V-3.8V is then determined (S306). If it is in the range 3.5V-3.8V (S306 returns Yes), the monitoring operation interval of the over-charge detection circuit 210 is set to 10 s because the voltage is far from the over-charge state and there is substantially no chance of soon entering the over-charge state (S307). If the voltage is not in the range 3.5 V-3.8 V (S306 returns No), the voltage is near the over-charge state and the monitoring operation interval of the over-charge detection circuit 210 is therefore set to 1 s (S308).

If step S304 determines that the voltage is not in the range 3.5V-4.1V (S304 returns No), operation of the over-charge detection circuit 210 is stopped because the battery voltage is far from the over-charge state and there is substantially no chance of soon entering the over-charge state (S309). As a result, power consumption by the over-charge detection circuit 210 can be further reduced.

Whether the acquired voltage is in the range 2.7V-2.9V is then determined (S310). If the voltage is in the range 2.7 V-2.9 V (S310 returns Yes), the voltage is near the over-discharge state and the monitoring operation interval of the over-discharge detection circuit 220 is set to 1 s (S311). If not in the range 2.7V-2.9V (S310 returns No), the over-discharge state is far, there is substantially no chance of soon entering the over-discharge state, and the monitoring operation interval of the over-discharge detection circuit 220 is therefore set to 10 s (S307).

As will be understood from the flow chart in FIG. 13, operation is controlled in this third embodiment of the invention as shown in FIG. 14.

When a fifth voltage is set to a voltage greater than the over-discharge detection voltage and less than the over-charge detection voltage (such as 3.5 V), and the storage battery 100 voltage is less than the fifth voltage, the timing signal generator 240 stops operation of the over-charge detection circuit 210 and monotonically decreases the monitoring operation interval of the over-discharge detection circuit 220 as the terminal voltage of the storage battery 100 falls. When the terminal voltage of the storage battery 100 is greater than the fifth voltage, the timing signal generator 240 stops operation of the over-discharge detection circuit 220 and monotonically decreases the monitoring operation interval of the over-charge detection circuit 210 as the terminal voltage of the storage battery 100 rises.

Note that operation may be controlled to further reduce power consumption by increasing the off time of the detection circuit when there is no danger of soon entering an over-charge state or over-discharge state as shown in FIG. 15 as a variation of the third embodiment.

This embodiment of the invention sets a third voltage (such as 3.0 V) that is higher than the over-discharge detection voltage and lower than the over-charge detection voltage, and sets a fourth voltage (such as 3.9 V) that is higher than the third voltage and lower than the over-charge detection voltage. When the storage battery 100 voltage is lower than the fourth voltage, the timing signal generator 240 applies control to stop operation of the over-charge detection circuit 210, and when the storage battery 100 voltage is greater than the third voltage, applies control to stop operation of the over-discharge detection circuit 220. When the detected storage battery 100 voltage is greater than or equal to the fourth voltage, the timing signal generator 240 monotonically shortens the monitoring operation interval of the over-charge detection circuit 210, and when the detected storage battery 100 voltage is less than or equal to the third voltage, monotonically shortens the monitoring operation interval of the over-discharge detection circuit 220.

As described above, this embodiment of the invention also provides a protection circuit 200 that can reduce power consumption while assuring the detection precision of the threshold voltage of normal operation.

2. Variations

It will be obvious to one with ordinary skill in the related art that the invention is not limited to the foregoing embodiments and can be varied in many ways.

Figure 16:
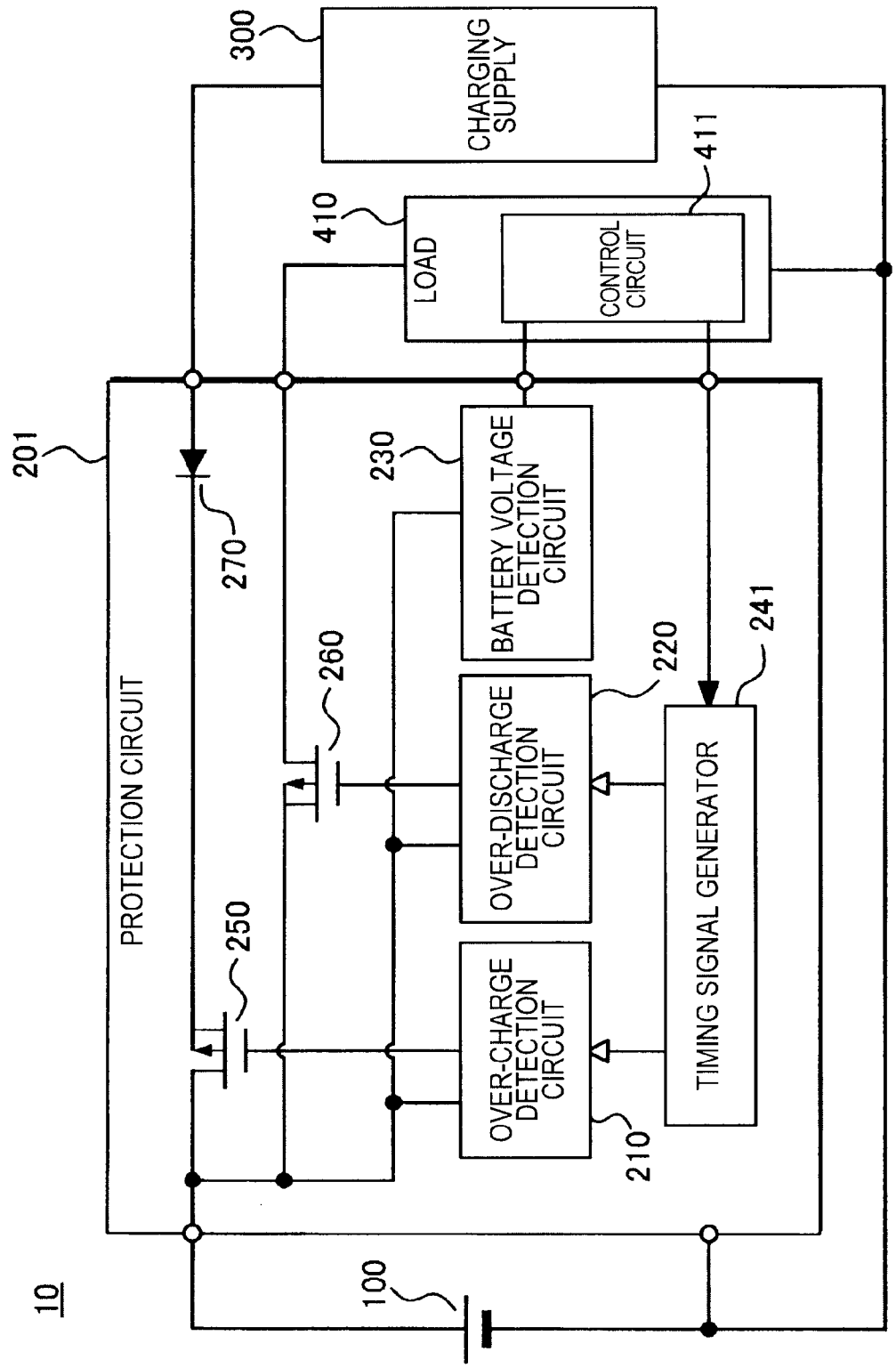
FIG. 16 is a block diagram showing another example of the configuration of an electronic device having a protection circuit according to the invention.

(1) In the foregoing embodiments the timing signal generator 240 of the protection circuit 200 controls the interval of the monitoring operation of the over-charge detection circuit 210 and the interval of the monitoring operation of the over-discharge detection circuit 220. As shown in FIG. 16, however, a control circuit 411 could be rendered in the load 410, and this control circuit 411 could acquire the storage battery 100 voltage from the battery voltage detection circuit 230 of the protection circuit 201, and control the interval of the monitoring operation of the over-charge detection circuit 210 and the interval of the monitoring operation of the over-discharge detection circuit 220 through the timing signal generator 241.

(2) In the embodiments and variations thereof described above, the over-charge detection circuit 210 is used to monitor the terminal voltage of the storage battery 100, and turn the charge control switch 250 off when the battery voltage is detected to exceed the over-charge detection voltage. The over-discharge detection circuit 220 is used to monitor the terminal voltage of the storage battery 100, and turn the discharge control switch 260 off when the detected voltage goes below the over-discharge detection voltage. This assumes that a lithium ion battery or other type of battery having danger zones on the high potential side and the low potential side is used as the storage battery 100. The invention is not so limited, however, and a nickel-cadmium battery that has a danger zone on the high potential side and not on the low potential side, for example, may be used as the storage battery 100. Because a danger zone is not on the low potential side in this configuration, the over-discharge detection circuit 220 and discharge control switch 260 can be omitted.

This configuration is predicated upon the protection circuit 200 being used with a charging supply 300 that produces charging power, and a storage battery 100 of which normal operation is conditional upon the terminal voltage being less than or equal to a maximum voltage. The protection circuit 200 includes a charge control switch 250 disposed in a first path electrically connecting the storage battery 100 and charging supply 300; second path electrically connecting the storage battery 100 and the load 400; a battery voltage detection circuit 230 that detects the terminal voltage of the storage battery 100; an over-charge detection circuit 210 that applies control turning the charge control switch 250 off when the monitored terminal voltage of the storage battery is detected to exceed the maximum voltage; and a timing signal generator 240 that controls the monitoring operation interval of the over-charge detection circuit 210 according to the storage battery 100 terminal voltage detected by the battery voltage detection circuit 230.

(3) The embodiments and variations described above use the same over-charge detection voltage to detect going from the normal operating range to the over-charge zone, and from the over-charge zone to the normal operating range, but the invention is not so limited. For example, exceeding a first over-charge detection voltage may be used to detect a change from the normal operating range to the over-charge state, and going below a second over-charge detection voltage may be used to detect a change from the over-charge state to the normal operating range. In this configuration the first over-charge detection voltage is higher than the second over-charge detection voltage. The control system can be stabilized by thus imparting a hysteresis characteristic to the state transition.

In addition, change to the over-discharge range from the normal operating range may be detected when the battery voltage goes below a first over-discharge detection voltage, and change from the over-discharge range to the normal operating range may be detected when a second over-discharge detection voltage is exceeded. In this case the first over-discharge detection voltage is lower than the second over-discharge detection voltage. The control system can be stabilized by thus imparting a hysteresis characteristic to the state transition.

(4) In the embodiment and variations described above a diode 270 is disposed to the protection circuit 200, 201, and the first path connecting the storage battery 100 and charging supply 300, and the second path connecting the storage battery 100 and load 410, are rendered separately. The invention is not so limited, however, and the first path and second path may be shared.

Figure 20:
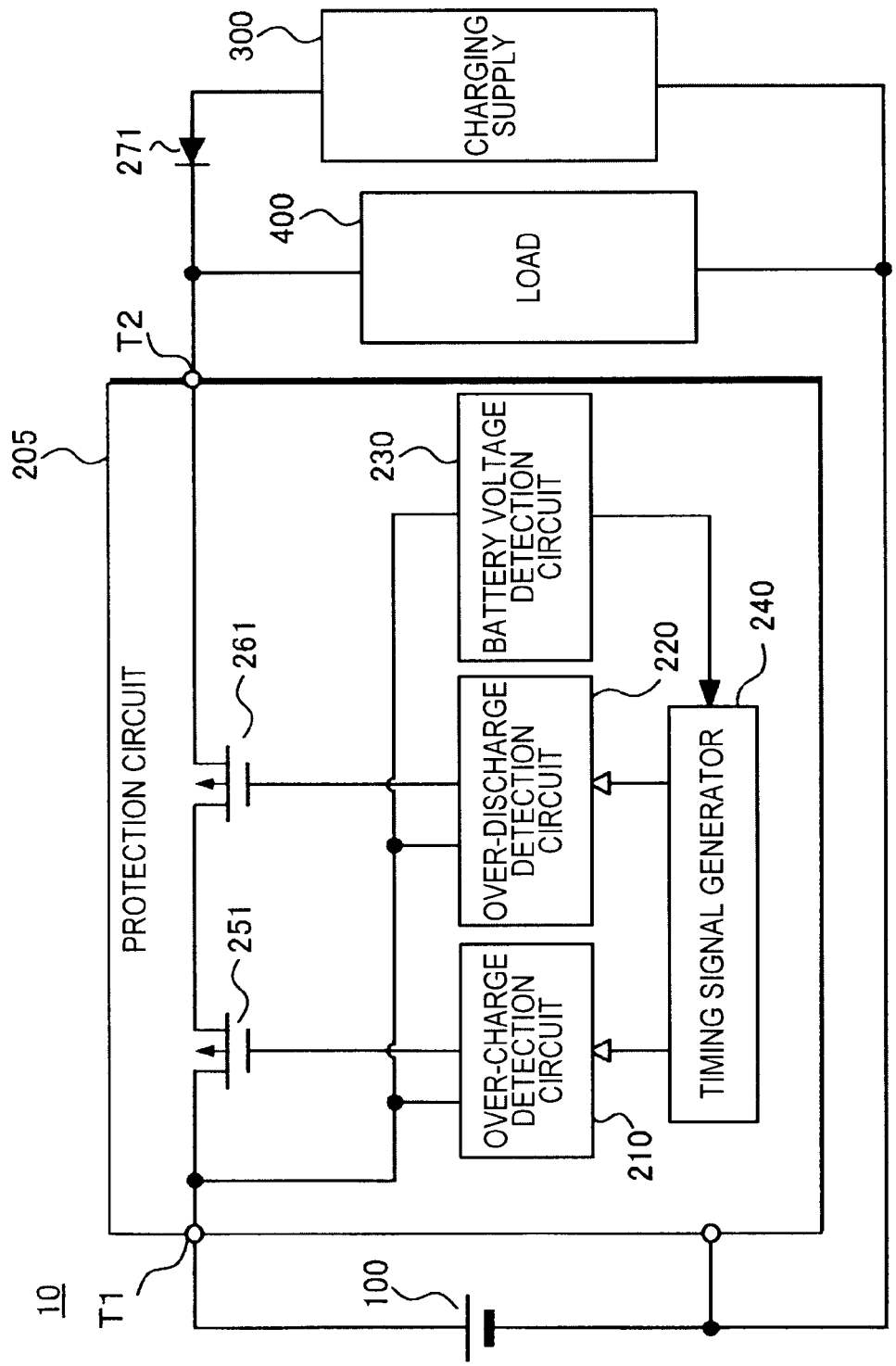
FIG. 20 is a block diagram showing another example of the configuration of an electronic device having a protection circuit according to another embodiment of the invention.

FIG. 20 is a block diagram showing the circuit configuration of an electronic device using a protection circuit 205 according to another embodiment of the invention. In this example a charge control switch 251 and a discharge control switch 261 are disposed to a single path connecting a first terminal T1 and a second terminal T2. A diode 271 is disposed between the charging supply 300 and second terminal T2, and the load 400 is connected to the second terminal T2.

When the terminal voltage of the storage battery 100 is greater than or equal to the over-discharge detection voltage and is less than or equal to the over-charge detection voltage, the timing signal generator 240 applies control so that the charge control switch 251 and discharge control switch 261 are on.

When the terminal voltage of the storage battery 100 is below the over-discharge detection voltage in the over-discharge state, the timing signal generator 240 applies control so that the charge control switch 251 is on and the discharge control switch 261 is off. In this case charge current can be supplied to the storage battery 100 through a parasitic diode formed parallel to the discharge control switch 261.

When the terminal voltage of the storage battery 100 is above the over-charge detection voltage in the over-charge state, the timing signal generator 240 applies control turning the charge control switch 251 off and the discharge control switch 261 on.

In this case discharge current can be supplied to the load 400 through a parasitic diode formed parallel to the charge control switch 251.

3. Electronic Device

The protection circuit described in the embodiments and variations thereof can be used in various types of electronic devices.

Figure 17:
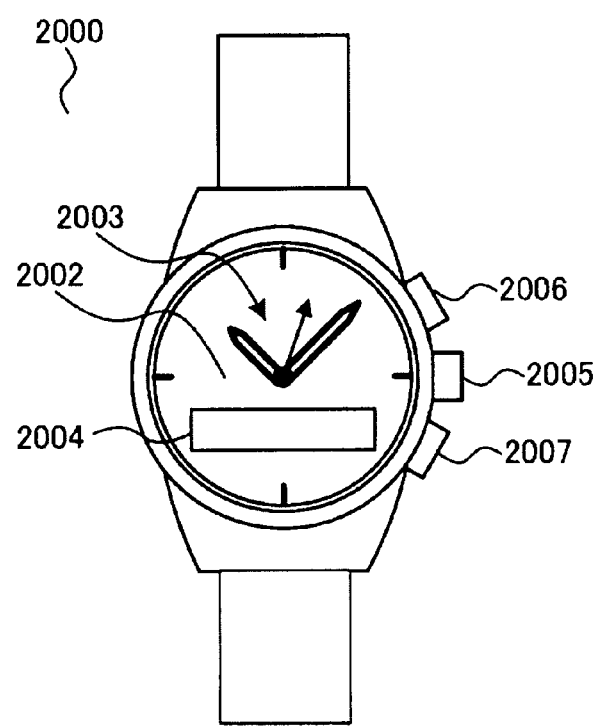
FIG. 17 is an oblique view of a wristwatch as an example of an electronic device.

FIG. 17 shows the configuration of a wristwatch as an example of an electronic device using the protection circuit according to the invention. The wristwatch 2000 has a time display unit including a dial 2002 and hands 2003. A window is formed in part of the dial 2002, and a solar cell 2004 is disposed in the window. The solar cell 2004 is an example of the charging supply 300 described above. The wristwatch 2000 also has a crown 2005 and button 2006, 2007. A storage battery 100 is used as the drive power supply of the wristwatch 2000, and the protection circuit of the invention is used to protect the storage battery 100 from over-charging and over-discharging.

Figure 18:
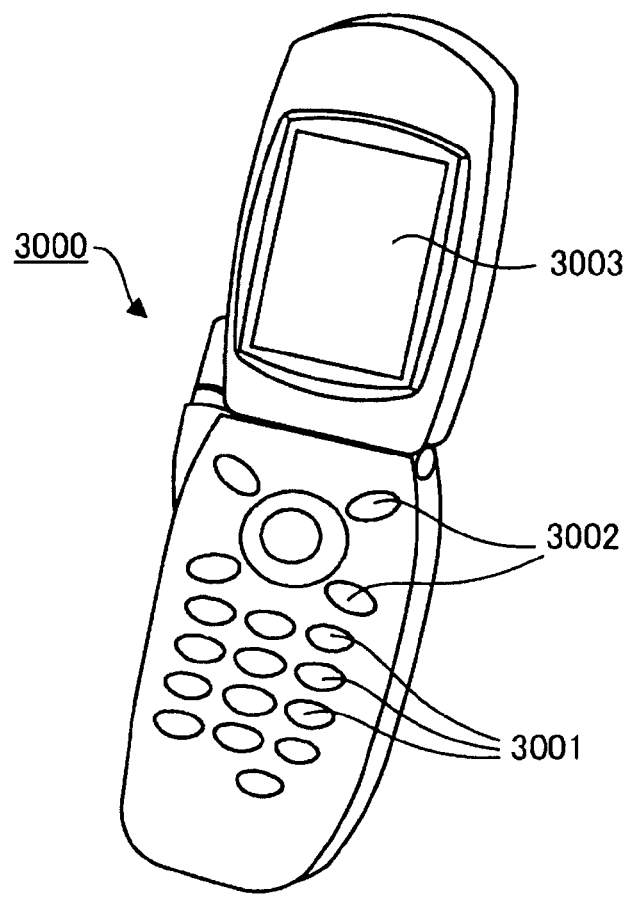
FIG. 18 is an oblique view of a cell phone as an example of an electronic device.

FIG. 18 shows the configuration of a cell phone as another example of an electronic device using the protection circuit according to the invention. The cell phone 3000 has a plurality of operating buttons 3001, a scroll button 3002, and an LCD unit 3003. A storage battery 100 is used as the drive power source of the cell phone 3000, and the protection circuit of the invention is used to protect the storage battery 100 from over-charging and over-discharging.

Figure 19:
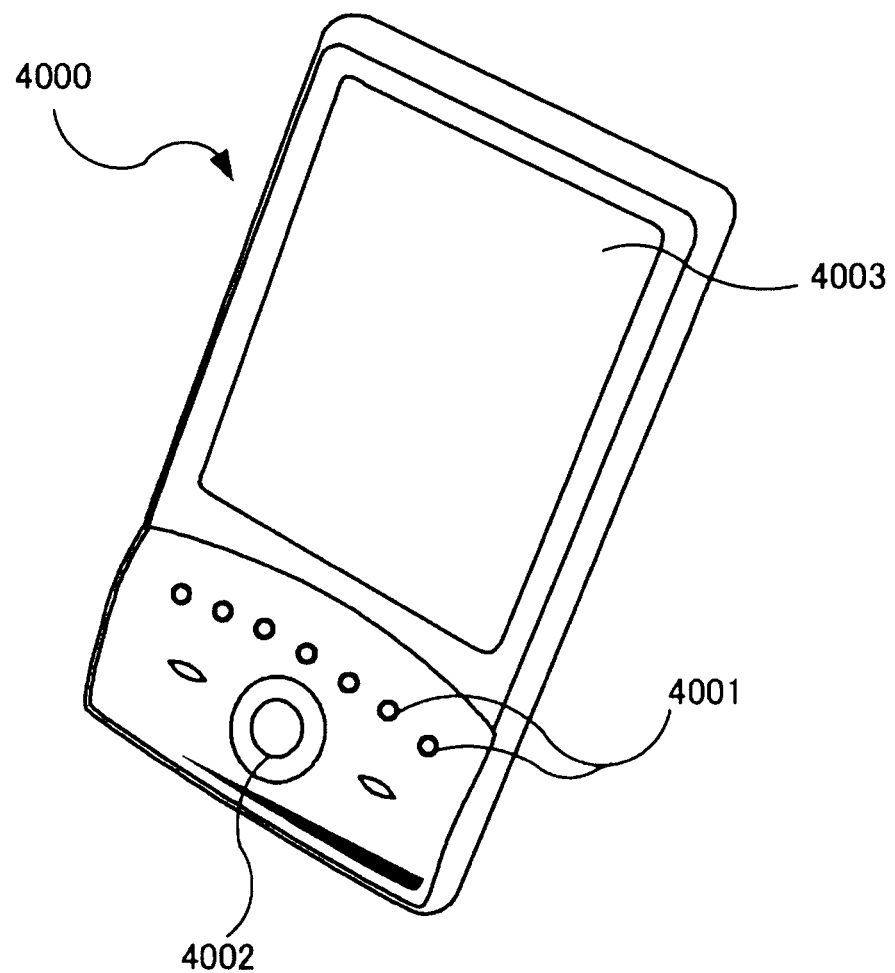
FIG. 19 is an oblique view of a portable information terminal as an example of an electronic device.

FIG. 19 shows the configuration of a portable information terminal (such as a personal digital assistant, or PDA) as another example of an electronic device using the protection circuit according to the invention. The PDA 4000 has a plurality of operating buttons 4001, a scroll button 4002, and an LCD unit 4003. A storage battery 100 is used as the drive power source of the PDA 4000, and the protection circuit of the invention is used to protect the storage battery 100 from over-charging and over-discharging.

In addition to the devices shown in FIG. 17 to FIG. 19, other examples of electronic devices that can use the protection circuit according to the invention include wristwatches, projectors, televisions, video cameras, car navigation systems, pagers, electronic notebooks, digital paper, calculators, word processors, workstations, videophones, POS terminals, printers, scanners, photocopiers, video players, and touch panel devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No. 2010-038914, filed Feb. 24, 2010, is expressly incorporated by reference herein.

What is claimed is:

1. A protection circuit that is used with a power supply that produces charging power, and a storage battery for which normal operation is conditional upon a terminal voltage being less than or equal to a maximum voltage, comprising:
    a first switch disposed to a first path that electrically connects the storage battery and the power supply;
    a second path that electrically connects the storage battery and a load;
    a voltage detection circuit that detects a terminal voltage of the storage battery;
    an over-charge detection circuit that monitors the storage battery terminal voltage and controls the first switch to turn off when the terminal voltage is detected to exceed the maximum voltage; and
    a control circuit that controls the monitoring operation interval of the over-charge detection circuit according to the terminal voltage of the storage battery detected by the voltage detection circuit.

2. A protection circuit that is used with a power supply that produces charging power, and a storage battery for which normal operation is conditional upon a terminal voltage being greater than or equal to a minimum voltage and less than or equal to a maximum voltage, comprising:
    a first switch disposed to a first path that electrically connects the storage battery and the power supply;
    a second switch disposed to a second path that electrically connects the storage battery and a load;
    a voltage detection circuit that detects a terminal voltage of the storage battery;
    an over-charge detection circuit that monitors the storage battery terminal voltage and controls the first switch to turn off when the terminal voltage is detected to exceed the maximum voltage;
    an over-discharge detection circuit that monitors the storage battery terminal voltage and controls the second switch to turn off when the terminal voltage is detected to be below the minimum voltage; and
    a control circuit that controls the monitoring operation interval of the over-charge detection circuit and the over-discharge detection circuit according to the terminal voltage of the storage battery detected by the voltage detection circuit.

3. The protection circuit described in claim 2, wherein:
    the voltage detection circuit detects the terminal voltage of the storage battery at a longer interval than the monitoring operation interval controlled by the control circuit.

4. The protection circuit described in claim 2, wherein:
    when first voltage is greater than the minimum voltage and less than the maximum voltage, and second voltage is greater than the first voltage and less than the maximum voltage,
    the control circuit controls the monitoring operation interval of the over-charge detection circuit and the over-discharge detection circuit to become longer when the detected storage battery terminal voltage is between the first voltage and the second voltage than when the detected storage battery terminal voltage is greater than or equal to the minimum voltage and less than the first voltage, or the detected storage battery terminal voltage is greater than the second voltage and less than or equal to the maximum voltage.

5. The protection circuit described in claim 2, wherein:
    when a first voltage is greater than the minimum voltage and less than the maximum voltage, and a second voltage is greater than the first voltage and less than the maximum voltage,
    the control circuit controls the monitoring operation interval of the over-discharge detection circuit to become longer when the detected storage battery terminal voltage is greater than or equal to the first voltage than when the detected storage battery terminal voltage is less than the first voltage, and
    when the detected storage battery terminal voltage is less than the second voltage, controls the monitoring operation interval of the over-charge detection circuit to become longer than when the detected storage battery terminal voltage is greater than or equal to the second voltage.

6. The protection circuit described in claim 2, wherein:
    the control circuit applies control stopping the monitoring operation of the over-discharge detection circuit when the over-charge detection circuit detects that the storage battery terminal voltage exceeds the maximum voltage, and
    applies control stopping the monitoring operation of the over-charge detection circuit when the over-discharge detection circuit detects that the storage battery terminal voltage is less than the minimum voltage.

7. The protection circuit described in claim 2, wherein:
    when a third voltage is greater than the minimum voltage and less than the maximum voltage, and a fourth voltage is greater than the third voltage and less than the maximum voltage,
    the control circuit applies control stopping the monitoring operation of the over-charge detection circuit when the detected storage battery terminal voltage is less than the fourth voltage, and
    controls stopping the monitoring operation of the over-discharge detection circuit when the detected storage battery terminal voltage is greater than the third voltage.

8. The protection circuit described in claim 7, wherein:
    the control circuit monotonically decreases the monitoring operation interval of the over-charge detection circuit as the detected storage battery terminal voltage increases when the detected storage battery terminal voltage is greater than or equal to the fourth voltage, and
    when the detected voltage is less than or equal to the third voltage, monotonically decreases the monitoring operation interval of the over-discharge detection circuit as the detected storage battery terminal voltage decreases.

9. An electronic device comprising:
    a power supply that produces charging power;
    a storage battery for which normal operation is conditional upon a terminal voltage being greater than or equal to a minimum voltage and less than or equal to a maximum voltage;
    a load; and
    the protection circuit described in claim 1.

* * * * *